May 24, 1966  M. DELANGE ET AL  3,252,755
METHODS FOR THE PREPARATION OF GRANULAR PRODUCTS AND IN
PARTICULAR OF URANIUM OXIDE
Filed April 13, 1961  2 Sheets-Sheet 1

United States Patent Office 3,252,755
Patented May 24, 1966

3,252,755
METHODS FOR THE PREPARATION OF GRANULAR PRODUCTS AND IN PARTICULAR OF URANIUM OXIDE
Maurice Delange, Bellancourt, Henri Huet, Saint-Vrain, and Paul Vertes, Mennecy, France, assignors to Commissariat a l'Energie Atomique, Paris, France, an organization created in France
Filed Apr. 13, 1961, Ser. No. 102,734
Claims priority, application France, May 18, 1960, 827,587
2 Claims. (Cl. 23—14.5)

The present invention relates to methods for the preparation of products and in particular uranium oxides in the granular form, it being well understood that the term "granular" applies in a general manner to products made of small lumps and in particular small elements of flat shape.

The chief object of this invention is to provide a method for this purpose which is less costly than those used up to the present time.

According to our invention, the method comprises forming an aqueous paste and subjecting it successively, in the form of a thin layer and in the state of small lumps, first to an instantaneous heating action for instance by contact with a surface or plate at suitable temperature, so as to form on the surface of the lumps a kind of crust having some consistency, then to a complementary heating action which dries the inside of the grains, these operations being preferably performed in a continuous manner.

A preferred embodiment of our invention will be hereinafter described with reference to the appended drawings given merely by way of example and in which.

Figure 1:
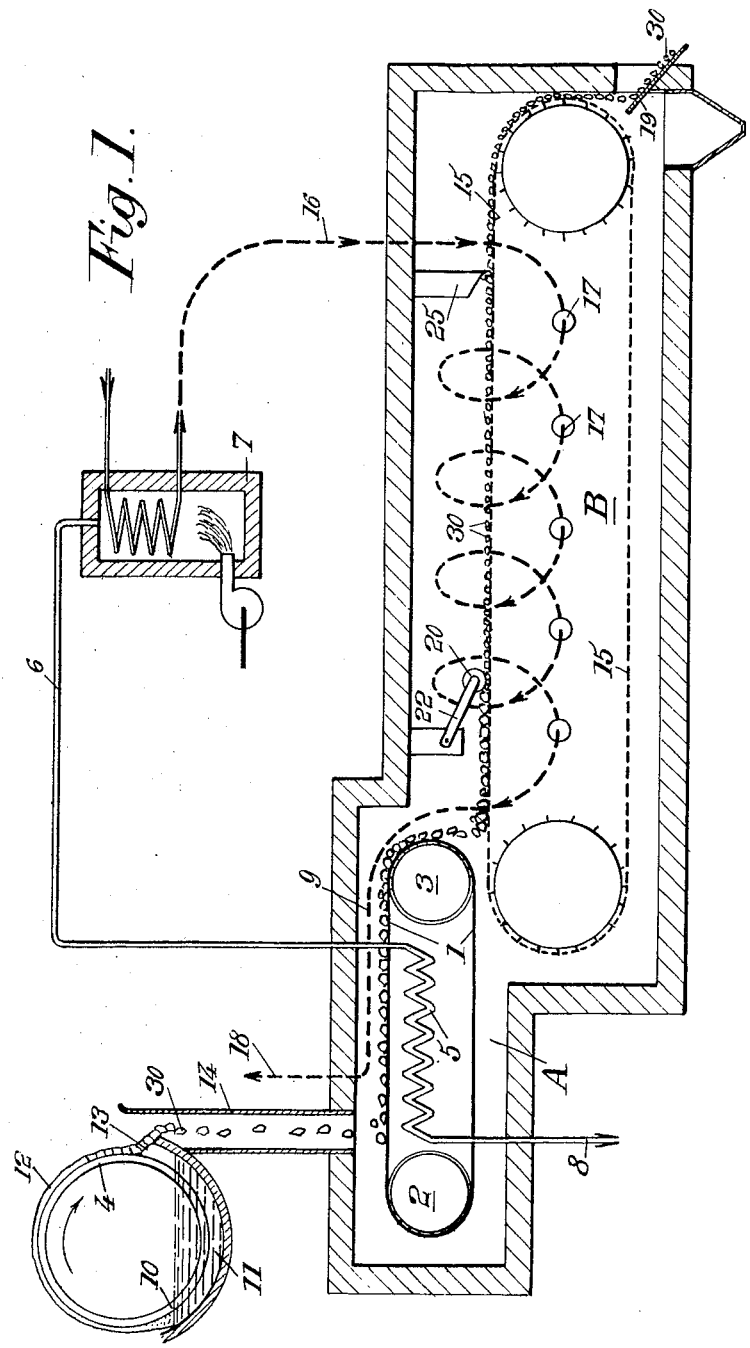
FIG. 1 is a diagrammatic vertical section of an apparatus for carrying out the method of preparing uranium oxides in the granular form according to the present invention.
Figure 2:
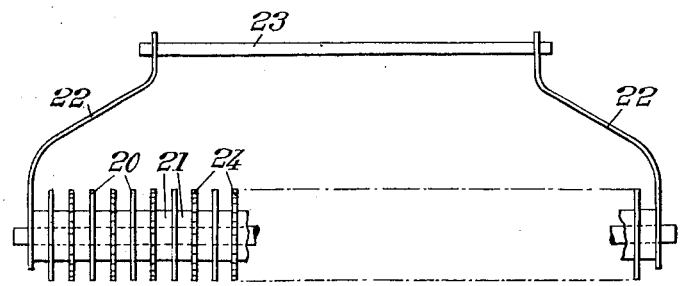
FIGS. 2 and 3 are an elevational view and a side view respectively of a crumbling device to be used in said apparatus for carrying out said method.
Figure 3:
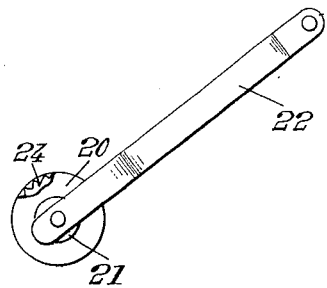

It will be reminded that the agglomeration of materials in the form of particles of regular dimension for subjecting it to chemical reactions under the effect of a gas is already known, in particular for the reduction of uranium oxides and for their treatment by hydrofluoric acid. The present invention relates particularly to such treatments.

As a rule, the aglomeration must be performed in conditions such that the particles or grains are on the one hand porous enough to permit the passage of gases therethrough and on the other hand sufficiently resistant from the mechanical point of view to support without crumbling the loads and other mechanical stresses taking place during the treatment, for instance due to a swelling of the material, such a swelling taking place in particular during the transformation of uranium oxide $UO_2$ into uranium tetrafluoride $UF_4$ under the action of gaseous hydrofluoric acid.

In the existing methods, the raw material is formed into pellets, for instance when this material consists of $UO_3$ which is to be subsequently reduced into $UO_2$ or when the material is in the state of $UO_2$ oxide.

These pellets are obtained by compressing the material by means of suitable machines and it permits of obtaining a granular material which is both porous and mechanically resistant but it requires machines which are rather expensive and the operation of which is relatively slow. Furthermore, the operation further involves a crushing and preliminary moistening of the oxide which necessitates another drying.

Now we have found that it is possible to avoid the use of such machines for compressing the material into pellets by directly preparing the particles from a sufficiently fluid paste which is subjected, in the state of small lumps, to a suitable drying and heating treatment. Experience taught that the granular material constituted by said lumps is sufficiently porous and mechanically resistant to permit the above mentioned reduction and fluoriding operations.

The treatment should generally include two successive steps, to wit:

A pre-drying step during which the small lumps of paste containing from 50 to 70% of water are fed to a support heated at a suitable temperature $t_1$ in order to form on the surface of said lumps a crust which will give every grain or particle a suitable mechanical resistance during subsequent operations, this temperature $t_1$ ranging advantageously from 150 to 250% C.;

And a drying and final heating step during which the inside of said grains or particles is dried so as to achieve the necessary porosity, this second step requiring the circulation of air or another oxidizing gas at a suitable temperature $t_2$ ranging for instance from 350 to 450° C.

Advantageously, the treatment is effected in a continuous fashion and preferably in the same furnace, which comprises successive elements corresponding to the above mentioned steps, the lumps moving along suitable conveyor means.

In order to divide the matter into small lumps to be fed to the first furnace element, we start from a relatively thin layer of paste (of a thickness ranging from 2 to 4 mm.), which is formed in a continuous fashion in a suitable device consisting in a rotating horizontal drum partly immersed in a bath of paste of ammonium uranate. This paste is broken into lumps when it is detached from the drum and these lumps are fed to the furnace where ammonium uranate will be transformed into uranium oxide and in particular $UO_3$ of $UO_3+UO_2$.

In the appended drawings, the two elements of the heating furnace have been designated respectively by A and B. The pre-drying furnace element A comprises an endless conveyor 1 moving between two drums 2 and 3 and adapted to receive the lumps of paste from the feeding device 4. This conveyor 1 is advantageously metallic so that it can be heated to the desired temperature $t_1$ and it may consist of a kind of belt or of solid metallic panels hinged to one another. It is stretched through suitable resilient means tending to move the axes of drums 2 and 3 away from each other.

Heating at temperature $t_1$ may be obtained through suitable means making use of heating fluid and/or of electricity. In the embodiment illustrated by the drawing, a heating coil 5 is disposed under the top branch of conveyor 1. This coil 5 is fed with the burnt gases supplied through a conduit 6 from a heating apparatus 7 containing an oil burner. In the heating apparatus 7, there is provided a coil for the circulation of air to be fed to the element B of the furnace as it will be hereinafter described.

FIG. 1 shows the device 4 for forming the lumps of paste. This device comprises a rotating filter drum having a horizontal axis and the lower portion 10 of which is immersed in a bath 11 of a fluid paste of ammonium uranate. Under the effect of a suction applied from the inside of the filter in a known manner, a layer of paste is formed on the drum 12. As son as this layer reaches the level of a scraper 13, an injection of compressed air from the inside of the drum separates the paste now broken into a multiplicity of small lumps 30 which drop through a passage 14 onto conveyor 1.

The portion B of the furnace comprises a conveyor 15 intended to receive the lumps having circulated on conveyor 1. This conveyor 15 is provided with holes as illustrated to permit the passage therethrough of hot air as diagrammatically shown at 16, this air circulation taking place in counter-current fashion with respect to the movement of the lumps 30 on conveyor 15. We have shown at 17 fan means through which air is suitably distributed so as to pass alternatively through the perforated conveyor. Hot air is obtained from the heating device 7 and it is at a temperature of about 400° C., this air being filtered before entering the furnace.

This air flows first through element B of the furnace and then through a portion of element A from which it issues at 18. Then it is collected by a dust removing device which may thus produce a small suction in the furnace.

Owing to the good heat exchange in the portion B of the furnace, we obtain at the delivery end of conveyor 15, at 19, a porous granular material having a good mechanical resistance and free from dust, this dust being periodically collected from the bottom of the furnace.

Advantageously, we provide above the active portion of conveyor 15 a device for breaking up the lumps 30 of too great dimensions or for preventing aggolmeration of said lumps.

This breaking up device comprises a set of discs 20 mounted on an axis 21, the whole being supported by arms 22 pivoted about an axis 23 and resting on the top of conveyor 15, the action of the weight of this device being generally sufficient to have the desired action upon the lumps of paste.

Some of the discs 20 may be provided with teeth as shown at 24.

These discs permit of obtaining a predetermined grain size. For instance, the maximum dimensions of the grains may range from 8 to 10 mm.

We may also provide, above the end of conveyor 15, fixed or rotating bars as shown at 25 to determine the maximum dimensions of the grains.

Of course, the furnace is provided with the usual means for measuring the output, the temperature and the pressure.

The granular material 30 obtained at the outlet of the furnace, at 19, is then fed to the reducing and fluoriding furnaces which are disposed close to the above described apparatus. These furnaces are advantageously made as described in the French Patent No. 1,107,592 filed June 19, 1944 and in the two addition patents filed respectively on November 5, 1957 and October 8, 1958. The above method and apparatus permit of dispensing with costly machines for the formation of pellets and of obtaining granular material in a continuous and quick fashion. It should be noted that the irregular shape of the particles forming the granular material as compared with the form of pellets obtained by compression tends to facilitate the action of the gases in the treatment furnaces.

In a general manner, while we have, in the above description, disclosed what we deem to be practical and efficient embodiments of our invention, it should be well understod that we do not wish to be limited thereto as there might be changes made therein without departing from the principle of the present invention as comprehended within the scope of the accompanying claims.

What we claim is:

1. The method of preparing granular uranium oxide which comprises forming an aqueous paste of ammonium uranate, dividing said paste into small lumps, subjecting said lumps to a sudden heating at a temperature of 150°–250° C. to form instantaneously, on the surface thereof, a crust having some consistency, and then performing in air a continued heating of said lumps at a temperature of 350°–450° C. to dry the inside thereof and transform said matter into uranium oxide.

2. The method of preparing granular uranium oxide which comprises forming a paste of ammonium uranate, removing a layer of said paste by means of a horizontal rotating drum having its lower portion immersed in said paste, detaching said layer from said drum in such manner as to break it into small lumps, dropping said lumps onto a conveyor heated at 150°–250° C. to form instantaneously, on the surface thereof, a crust having some consistency, and then performing in air a continued heating of said lumps at 350°–450° C. to dry the inside thereof and transform said matter into uranium oxide.

References Cited by the Examiner

UNITED STATES PATENTS

| | | | |
|---|---|---|---|
| 1,210,714 | 1/1917 | Seil | 23—14.5 |
| 2,761,767 | 9/1956 | Perieres | 23—262 |
| 2,906,598 | 9/1959 | Googin | 23—14.5 |
| 2,953,430 | 9/1960 | Leaders et al. | 23—14.5 |
| 3,010,802 | 11/1961 | Schenk et al. | 23—262 |
| 3,035,895 | 5/1962 | McCorkle et al. | 23—14.5 |
| 3,041,136 | 6/1962 | Hedley et al. | 23—14.5 |

OTHER REFERENCES

Bancroft et al.: ADU Reduction Studies, May 1958, AECL–586, page 4.

CARL D. QUARFORTH, *Primary Examiner*.